United States Patent [19]

Ichikawa et al.

[11] Patent Number: 4,708,800
[45] Date of Patent: Nov. 24, 1987

[54] HOLLOW FIBER MEMBRANE AND METHOD FOR MANUFACTURE THEREOF

[75] Inventors: Toshiji Ichikawa, Chofu; Kazuaki Takahara, Tokyo; Kazuhiro Shimoda; Yukio Seita, both of Fuji; Makoto Emi, Fujinomiya, all of Japan

[73] Assignee: Terumo Kabushiki Kaisha, Tokyo, Japan

[21] Appl. No.: 782,523

[22] Filed: Oct. 1, 1985

[30] Foreign Application Priority Data

Oct. 9, 1984 [JP] Japan ................................ 59-210466

[51] Int. Cl.$^4$ ................... B01D 47/100; B01D 59/10; D02G 3/00
[52] U.S. Cl. .......................... 210/500.23; 210/500.36; 428/372; 428/376; 428/398
[58] Field of Search .................... 428/376, 398, 372; 210/500.2, 500.22, 500.23, 500.36

[56] References Cited

U.S. PATENT DOCUMENTS

| 3,954,927 | 5/1976 | Duling et al. ............. 264/211 X |
| 4,020,230 | 4/1977 | Mahoney et al. ............. 210/500.2 |
| 4,100,238 | 7/1978 | Shinomura ............................. 264/49 |
| 4,405,688 | 9/1983 | Lowery et al. ............... 210/500.2 |
| 4,587,163 | 5/1986 | Zachariades ......................... 428/364 |

FOREIGN PATENT DOCUMENTS 2026381 2/1980 United Kingdom .
2115425 9/1983 United Kingdom .

Primary Examiner—Lorraine T. Kendell
Attorney, Agent, or Firm—Frishauf, Holtz, Goodman & Woodward

[57] ABSTRACT

A porous hollow fiber membrane, comprising a polyolefin hollow fiber membrane of an annular cross section of substantial circle 150 to 300 μm in inside diameter and 10 to 150 μm in wall thickness, said hollow fiber membrane forming on the inner wall side thereof a tight layer of intimately bound fine polyolefin particles and on the outer wall side thereof a porous texture of fine polyolefin particles bound in chains and containing fine pores extended continuously form said inner wall side to said outer wall side.

13 Claims, 22 Drawing Figures

HOLLOW FIBER MEMBRANE AND METHOD FOR MANUFACTURE THEREOF

BACKGROUND OF THE INVENTION

1. Field of the Invention:

This invention relates to a hollow fiber membrane and to a method for the manufacture thereof. Particularly this invention relates to a porous hollow fiber membrane possessing a high gas-exchange capacity and to a method for the manufacture thereof. More particularly, this invention relates to a porous hollow fiber membrane insusceptible to blood plasma leakage during protracted use, capable of retaining a high gas-exchange capacity, and appropriate to use in an artificial lung and to a method for the manufacture thereof.

2. Description of Prior Art:

Generally, during the course of a surgical operation of heart, for example, an artificial lung of a hollow fiber membrane is used in the external circulatory path for the purpose of adding oxygen to and removing carbon dioxide gas from the blood plasma continuously drawn out of the patient's body. The hollow fiber membranes currently used in such artificial lungs fall under the two types; homogeneous membranes and porous membranes. In the homogeneous membranes, passage of a gas is effected on the basis that the molecules of the permeating gas are dissolved and diffused in the membrane. A typical homogeneous membrane is made of silicone rubber and has already been commercialized under a designation of Collobow membrane type lung. Under the restriction on the permeability to gas, all the homogeneous membranes heretofore accepted as feasible for actual service are invariably made of silicone rubber. No homogeneous membrane of silicone rubber is allowed to have its thickness decreased below 100 $\mu$m because of the limited strength of silicone rubber. As a natural consequence, homogeneous membranes of silicone rubber exhibit limited permeability to gases and particularly poor permeability to carbon dioxide gas. Further, the silicone rubber has the disadvantage that it is expensive and deficient in fabricability.

In the porous membranes, since the fine pores incorporated in the membrane are conspicuously large as compared with the molecules of a gas desired to permeate the membrane, the gas passes through the pores in the form of volume flow. Various artificial lungs using porous membranes such as, for example, a microporous polypropylene membrane have been proposed. It has been proposed to manufacture porous polypropylene hollow fibers by melt spinning polypropylene through a hollow fiber producing nozzle at a temperature in the range of 210° to 270° C. at a draft ratio of 180 to 600, then subjecting the extruded hollow fibers to a first heat treatment at a temperature not exceeding 155° C., stretching the hot hollow fibers by 30 to 200% at a temperature less than 110° C., and thereafter subjecting the stetched hollow fibers to a second heat treatment at a temperature exceeding the temperature of the first heat treatment and not exceeding 155° C. Japanese Patent Publication SHO No. 56(1981)-52,123. The porous hollow fibers obtained by this procedure, by nature, form fine pores in themselves by being stretched. The pores so formed, therefore, lack uniformity. These pores are linear pores substantially parallel to the direction of thickness of the membrane and they are formed because the hollow fibers sustain cracks in the direction of the axial line thereof in proportion to the degree of stretching. Thus, these pores have a substantially square or rectangular cross section. The pores run substantially linearly throughout the entire thickness of hollow fibers and they are distributed so densely as to increase the porosity of the hollow fibers. The porous hollow fibers, therefore, exhibit a high permeability to steam and suffer from degradation of performance due to deposition of water condensate. Moreover, they have the possibility of entailing leakage of blood plasma after their protracted use in the circulation of blood. Insufficient strength constitutes another drawback of the porous hollow fibers.

An object of this invention, therefore, is to provide a novel hollow fiber membrane and a method for the manufacture thereof.

Another object of this invention is to provide a porous hollow fiber membrane possessing a high gas-exchange capacity and a method for the manufacture thereof.

Yet another object of this invention is to provide a hydrophobic hollow fiber membrane which entails no leakage of blood plasma and retains high gas-exchange capacity intact during the course of its protracted use and, therefore, suits utility in an aritifical lung and a method for the manufacture thereof.

SUMMARY OF THE INVENTION

The objects described above are accomplished by a porous hollow fiber membrane, comprising a polyolefin hollow fiber membrane of an annular cross section of substantial circle 150 to 300 $\mu$m in inside diameter and 10 to 150 $\mu$m in wall thickness, the hollow fiber membrane forming on the inner wall side thereof a tight layer of intimately bound fine polyolefin particles and on the outer wall side thereof a porous texture of fine polyolefin particles bound in chains and containing fine pores extended continuously from the inner wall side to the outer wall side.

This invention also relates to a hydrophobic porous hollow fiber membrane which possesses, in the inner wall side through the outer wall side of the hollow fiber membrane, an anisotropic membrane structure such that the interstices of the fine particles decrease toward the inner wall side so as to give rise to a tight layer. This invention further relates to a porous hollow fiber membrane having a porosity in the range of 5 to 60%. This invention also comprises a porous hollow fiber membrane having gas flux in the range of 0.1 to 1,000 liters/min.m$^2$.atm, preferably 1.0 to 500 liters/min.m$^2$.atm. Further this invention comprises a porous hollow fiber membrane whose discrete fine particles on the outer wall side have an average particles diameter in the range of 0.01 to 1.0 $\mu$m. This invention also resides in a porous hollow fiber membrane having an inside diameter in the range of 180 to 250 $\mu$m and a wall thickness in the range of 20 to 100 $\mu$m. This invention also resides in a porous hollow fiber membrane which uses polyethylene or polypropylene, preferably polypropylene, as the polyolefin. Further, this invention concerns a porous hollow fiber membrane having at least the inner wall surface thereof treated to be furnished with hydrophilicity.

The aforementioned objects are accomplished by a method for the manufacture of a hollow fiber membrane, characterized by the steps of mixing a polyolefin, an organic filler uniformly dispersible in the polyolefin under conditions capable of melting the polyolefin and readily soluble in an extractant to be used, and a crystal seed forming agent, discharging the resultant mixture in a molten state through an annular spinning orifice and, at the same time, introducing an inert gas into the hollow center of the discharged tube of the mixture, advancing the discharged tube into contact with a cooling and solidifying liquid incapable of melting the polyolefin thereby cooling and solidifying the tube, and subsequently bringing the cooled and solidified tube into contact with an extractant incapable of melting the aforementioned polyolefin thereby extracting the aforementioned organic filler out of the tube.

The aforementioned objects are further accomplished by a method for the manufacture of a hollow fiber membrane, characterized by the steps of mixing a polyolefin, an organic filler uniformly dispersible in the polyolefin under conditions capable of melting the polyolefin and readily soluble in an extractant to be used, and a crystal seed forming agent, discharging the resultant mixture in a molten state through an annular spinning orifice and, at the same time, introducing an inert gas into the hollow center of the discharged tube of the mixture, advancing the discharged tube into contact with a cooling and solidifying liquid incapable of melting the polyolefin thereby cooling and solidifying the tube, subsequently bringing the cooled and solidifed tube into contact with an extractant incapable of melting the polyolefin thereby extracting the organic filler out of the tube, and subjecting the resultant tube to a heat treatment.

This invention also relates to a method for the manufacture of a hollow fiber membrane which uses polyethylene or polypropylene as the polyolefin. Further this invention relates to a method for the manufacture of a hollow fiber membrane which uses as the organic filler a hydrocarbon having a boiling point higher than the melting point of the polyolefin. This invention relates to a method for the manufacture of a hollow fiber membrane which uses as the hydrocarbon a liquid paraffin or an α-olefin oligomer. Further this invention relates to a method for the manufacture of a hollow fiber membrane which uses the organic filler in an amount of 35 to 150 parts by weight based on 100 parts by weight of the polyolefin. This invention also relates to a method for the manufacture of a hollow fiber membrane which uses as the crystal seed forming agent an organic heat-resistant substance having a melting point of not less than 150° C. and a gel point higher than the crystallization starting point of the polyolefin. This invention relates to a method for the manufacture of a hollow fiber membrane which uses the crystal seed forming agent in an amount of 0.1 to 5 pars by weight based on 100 parts by weight of the polyolefin. This invention relates to a method for the manufacture of a hollow fiber membrane which causes the cooling and solidifying liquid and the discharge tube to come into mutual contact in the form of parallel flow contact. Further, this invention relates to a method for the manufacture of a hollow fiber membrane which uses as the cooling and solidifying liquid at least one member selected from the group consisting of alcohols, liquid fatty acids and esters thereof, and halogenated hydrocarbons. This invention relates to a method for the manufacture of a hollow fiber membrane which uses as the extractant at least one member selected from the group consisting of hydrocarbons and halogenated hydrocarbons. This invention relates to a method for the manufacture of a hollow fiber membrane which carries out the heat treatment at a temperature in the range of 50° to 150° C.

DESCRIPTION OF PREFERRED EMBODIMENT

Figure 1:
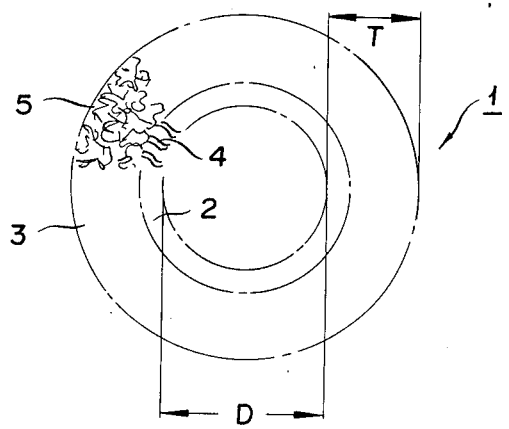
FIG. 1 is a model cross section of a porous hollow fiber membrane according with the present invention.

Now, this invention will be specifically described below with reference to the accompanying drawings. FIG. 1 is a diagram depicting in a model the cross section of a hollow fiber according with this invention. It represents a hollow fiber membrane 1 made of polyolefin in an annular cross section of substantially true circle having an inside diameter, D, in the range of 150 to 300 μm, preferably 180 to 250 μm, and a wall thickness, T, in the range 10 to 150 μm, preferably 20 to 100 μm, and more preferably 40 to 50 μm. This hollow fiber membrane 1 forms on the inner wall side thereof a relatively tight layer 2 and on the outer wall side thereof a porous texture layer 3 having a multiplicity of fine polyolefin particles of an average particle diameter of 0.01 to 1.0 μm, preferably 0.05 to 0.5 μm, and more preferably 0.3 to 0.5 μm, bound in the form of chains. Fine pores 4 in the tight layer 2 and fine pores 5 in the porous texture layer 3 communicate with each other to give rise to continuous pores extending between the inner wall side an outer wall side.

Figure 2:
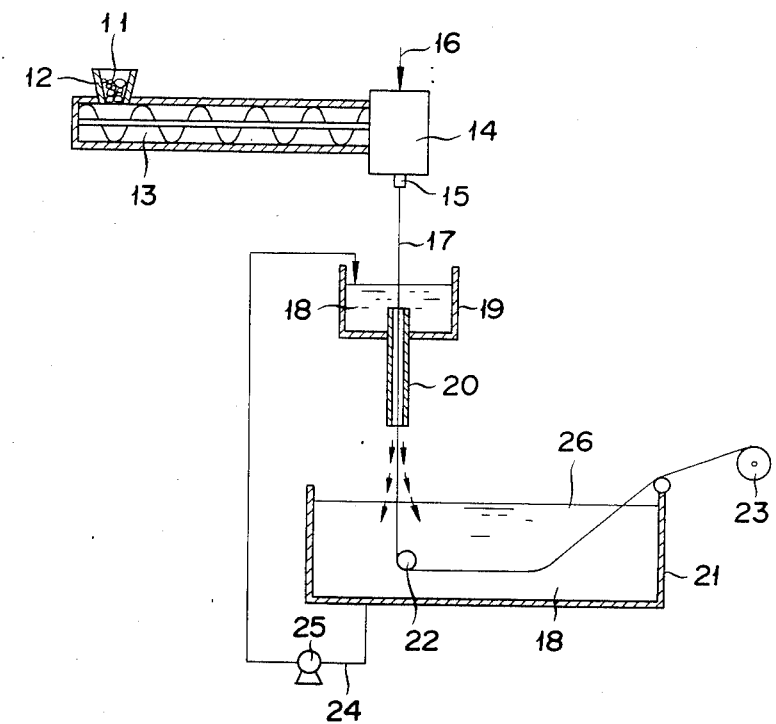
FIG. 2 is a schematic cross section of an apparatus to be used for the manufacture of a hollow fiber membrane of the present invention.

The porous hollow fiber membrane of the foregoing description is manufactured as follows. As illustrated in FIG. 2, a mixture 11 comprising a polyolefin, an organic filler, and a crystal seed forming agent is fed through a hopper 12 into a kneading machine such as, for example, a twin-screw extruder 13, which melts and blends, extrudes, and feeds the mixture into a spinning device 14. The molten mixture is discharged through an annular spinning orifice (not shown) of a spinneret 15 into a gaseous atmosphere such as, for example, the air. At the same time, an inert gas supplied via a line 16 is introduced into the hollow center of the discharged tube of the fused mixture. A hollow thread 17 so formed is introduced into a cooling tank 19 holding therein a cooling and solidifying liquid 18 so as to be cooled and solidified therein by contact with the cooling and solidifying liquid 18. In this case, the contact between the hollow thread 17 and the cooling and solidifying liquid 18 is desired to be established, as illustrated in FIG. 2, by allowing the cooling and solidifying liquid 18 to flow down the interior of a cooling and solidifying liquid flow tube 20 disposed as downwardly extended through the bottom of the cooling tank 19 and allowing the hollow thread 17 to come into parallel flow contact with the descending flow of the cooling and solidifying liquid 18. The fallen cooling and solidifying liquid 18 is received and stored in a solidifying tank 21. The hollow thread 17 is introduced into the solidifying tank 21, then advanced therein and caused to change direction by a direction changing bar 22 so as to be solidified by thorough exposure to the cooling and solidifying liquid 18. The solidified hollow thread is then taken up on a takeup bobbin 23. When the pool of the cooling and solidifying liquid grows in volume, it is discharged through a line 24 and circulated by a pump 25 back to the cooling tank 19. When the cooling and solidifying liquid happens to be a highly volatile and water-immiscibel substance such as a halogenated hydrocarbon as described afterward, an upper layer 26 such as of water may be superposed on the pool of the cooling and solidifying liquid for the purpose of preventing the liquid from being vaporized into the ambient air.

After the cooled and solidified hollow thread 17 has been taken up on the bobbin 23 as described above, it is cut into pieces of a prescribed length, then immersed in an extractant thereby removing the organic filler from the cut pieces of hollow thread 17, and then dried as occasion demands. Consequently, there are obtained hollow fiber membranes. The hollow fiber membrane so produced can be subjected to a heat treatment for the purpose of acquiring further improved dimensional stability.

Concrete examples of the polyolefin usable as the raw material in this invention include polypropylene and polyethylene. The selected polyolefin is desired to possess a melt index (M.I.) in the range of 5 to 70, preferably 10 to 40. Among other polyolefins ansering the foregoing description, polypropylene proves to be most desirable. In various grads of polypropylene, those having higher degrees of crystallinity prove to be more desirable.

The crystallinity represents the gravimetric percentage of the portion of crystals based on the total amount of a substance under discussion. It is determined by means of X-ray diffraction, IR spectrum, density, etc. Generally, the vinyl type polymer $-(CH_2-CHR)_n$ can assume any of the three stereochemical structures, i.e. isotactic and syndiotactic structures both of regularity and an atactic structure of irregularity. In the polymer, the ease of crystallization increases in proportion as the proportion of an isotactic structure or syndiotactic structure grows in amount. This rule applies to polypropylene. The crystallinity of polypropylene increases with the increasing proportion of the isotactic structure or the increasing degree of tacticity. The polypropylene to be used for this invention is desired to have tacticity of at least 97%, although this desirability may be determined by using crystallinity as another possible criterion.

For the purpose of this invention, the organic filler is required to be uniformly dispensible in the polyolefin under conditions allowing the polyolefin to assume a molten state and, at the same time, readily soluble in the extractant to be used for the purpose described more fully afterward. Examples of the filler satisfying this requirement include liquid paraffin (number-average molecular weight 100 to 2,000), α-olefin oligomers [such as ethylene oligomer (number-average molecular weight 100 to 2,000), propylene oligomer (number-average molecular weight 100 to 2,000), and ethylene-propylene cooligomer (number-average molecular weight 100 to 2,000)], paraffin wax (number-average molecularr weight 200 to 2,500), and various hydrocarbons. Among other fillers enumerated above, liquid paraffin proves to be particularly desirable.

The mixing ratio of the organic filler to the polyolefin is 35 to 150 parts by weight, preferably 50 to 140 parts by weight, per 100 parts by weight of the polyolefin. If the amount of the organic filler is less than 35 parts by weight, the produced porous hollow fiber membrane possesses no sufficient permeability to gas. If the amount exceeds 150 parts by weight, the mixture of the organic filler and the polyolefin possesses too low viscosity to be molded into the hollow thread with high efficiency. The raw material satisfying the mixing ratio just described is prepared (designed) by the pre-mixing method which comprises melting and blending a mixture containing the two components in the prescribed ratio with a proper extruder such as a twin-screw extruder, extruding the resultant mix, and pelletizing the extruded mix. The crystal sead forming agent to be incorporated in the raw material of the present invention is an organic heatresistant substance having a melting point of not less than 150° C., preferably 200° to 250° C., and a gel point higher than the crystallization starting point of the polyolefin to be used. This crystal seed forming agent is incorporated because this agent promotes reduction in size of the polyolefin particles and further decreases the diameter of the fine pores. Examples of the crystal seed forming agent include 1,3,2,4-dibenzylidene sorbitol, 1,3,2,4-bis(pmethylbenzylidene)-sorbitol, 1,3,2,4-bis-(p-ethylbenzylidene)-sorbitol, sodium bis(4-t-butylphenyl)phosphate, sodium benzoate, adipic acid, talc, and kaolin. The differences caused in the pore diameter and the fine particle diameter in the hollow fiber membrane by the presence and absence of the incorporation of the crystal seed forming agent are shown in Table 4.

The mixing ratio of the crystal seed forming agent to the polyolefin is 0.1 to 5 parts by weight, preferably 0.3 to 1.0 part by weight per 100 parts by weight of the polyolefin.

The mixture of raw materials prepared as described above is melted and kneaded at a temperature of 160° to 250°, preferably 180° to 220°, with an extruder such as a twin-screw extruder. Then, the molten mixture is discharged through an annular orifice of a spinning device into a gaseous atmosphere and, at the same time, an inert gas such as nitrogen, carbon dioxide, helium, argon, or air is introduced into the hollow center of the discharged tube of the molten mixture to form a hollow thread. This hollow thread is caused to fall down and come into contact with the cooling tank. The distance of this fall of the hollow thread is desired to be 5 to 1,000 mm, preferably 10 to 500 mm. If the distance of the fall is less than 5 mm, there is the possibility that the descending hollow thread will benerate pulsation and crush itself on entering the cooling and solidifying liquid. Inside this cooling tank, the aforementioned hollow thread is into sufficiently solidified and the hollow center thereof is filled with the inert gas. Thus, the hollow thread is liable to be deformed by an external force. The hollow thread can be prevented from the deformation by the external force (fluid pressure, for example) by allowing the cooling and solidifying liquid 18 to flow down the interior of the cooling and solidifying liquid flow tube 20 disposed as downwardly extended through the bottom of the cooling tank 19 as illustrated in FIG. 2 and causing the hollow thread to come into parallel flow contact with the descending liquid 18 thereby inducing forced downward movement of the hollow thread. In this case, the flow rate of the cooling and solidifying liquid has only to be that which is naturally caused by gravitational attraction. The cooling temperature at the time is 10° to 60° C., preferably 20° to 50° C. If the cooling temperature is less than 10° C., the speed of cooling and solidifying is so high that the greater part of the wall thickness of the hollow thread is turned into a tight layer and the produced hollow fiber membrane suffers from an inferior gas-exchange capacity. If the cooling temperature exceeds 60°, the speed of crystallization of the polyolefin is so slow that the fine particles on the outer wall side grow excessively in diameter and the continuous fine pores gain excessively in diameter, with the result that the tight layer grows extremely thin and, with a further elevation of temperature, even ceases to exist. The hollow fiber membrane resulting from this hollow thread, when used in an artificial lung, for example, has the possibility of sustaining clogging or inducing leakage of blood plasma.

As the cooling and solidifying liquid, any liquid substance can be used so long as it avoids melting the polyolefin and possesses a relatively high boiling point. Examples of the liquid substance usable as the cooling and solidifying liquid include alcohols such as methanol, ethanol, propanols, butanols, hexanols, oxtanols, and lauryl alcohol, liquid fatty acids such as oleic acid, palmitic acid, myristic acid, and stearic acid and alkyl esters thereof (such as esters of methyl, ethyl, isopropyl, and butyl), and halogenated hydrocarbons, particularly chlorofluorinated hydrocarbones such as 1,1,2-trichloro1,2,2,-trifluoroethane, trichlorofluoromethane, dichlorofluoromethane, and 1,1,2,2,-tetrachloro-1,2,-difluoroethane. In all the liquid substances enumerated above, those which are capable of melting the aforementioned organic filler such as halogentated hydrocarbons prove to be particularly desirable. When a halogenated hydrocarbon is used, the extraction of the organic filler is effected to some extent while the hollow thread is being solidifed in the solidifying tank. When this halogenated hydrocarbon happens to be identical with the extractant which is used in the subsequent step of extraction, the work for the removal of the used cooling and solidifying liquid is obviated and the possibility of the extractant being defiled is eliminated. Moreover, the use of the halogenated hydrocarbon warrants freedom from worry about fire. Among other halogenated hydrocarbons, chlorofluorinated hydrocarbons prove particularly desirable because they are safe to human system.

The cooling and solidifying liquid which has flowed through the cooling and solidifying liquid flow tube is received and stored in the solidifying tank disposed below. The hollow thread is completely solidified by being passed through the cooling and solidifying liquid held inside this solidifying tank. Then, the solidified hollow thread is taken up.

The hollow thread so taken up is cut into pieces of a prescribed length such as 20 to 50 cm. The cut pieces of the hollow thread are immersed in the extractant at a temperature of 0° to 50° C., preferably 20° to 40° C., for 1 to 30 minutes, preferably 3 to 20 minutes to produce hollow fiber membranes. In this case, the extraction is effected most desirably by the so-called constant-length extraction, i.e. an operation wich completes the entire course of extraction treatment in a fixed length of time.

As the extractant, any liquid substance capable of melting and extracting the organic filler without melting the polyolefin forming the hollow fiber membrane can be used. Examples of the liquid substance meeting this requirement include hydrocarbons and halogenated hydrocarbons such as 1,1,2-trichloro-1,2,2-trifluoroethane, trichlororfluoromethane, dichlorofluoromethane, and 1,1,2,2-tetrachloro-1,2-difluoroethane. Among these hydrocarbons and halogenated hydrocarbons enumerated above, halogenated hydrocarbons prove particularly desirable in terms of the extracting capacity exhibited against the organic filler. Particularly from the standpoint of safety to human system, chlorofluorinated hydrocarbons prove especially suitable.

The hollow fiber membrane obtained as described above, when necessary, is subjected to a heat treatment. This heat treatment is carried out in a gaseous atmosphere such as air, nitrogen, or carbon dioxide at a temperature of 50° to 160° C., preferably 70° to 140° C., for 1 to 120 minutes, preferably 2 to 60 minutes. By this heat treatment, the hollow fiber membrane is structurally stabilized and improved in dimensional stability. In this case, the hollow fiber membrane may be stretched before or after the heat treatment.

Figure 3:
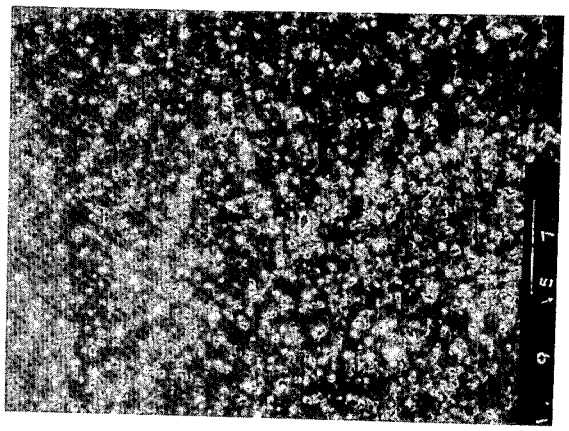
FIGS. 3–8 are photographs of textures of hollow fiber membranes of this invention taken through a scanning electron microscope.
Figure 4:
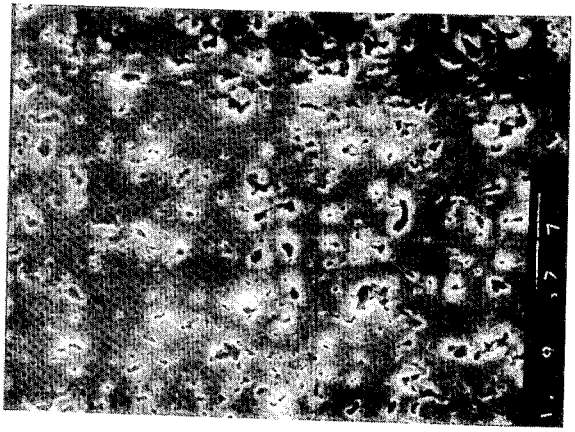
Figure 5:
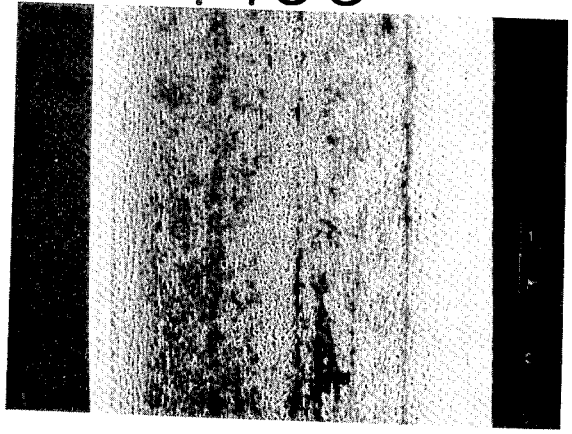
Figure 6:
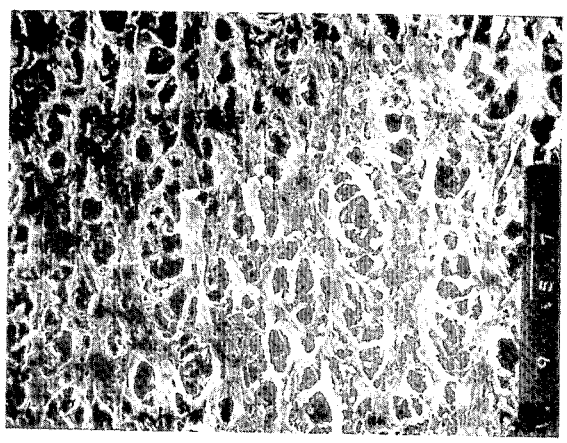
Figure 7:
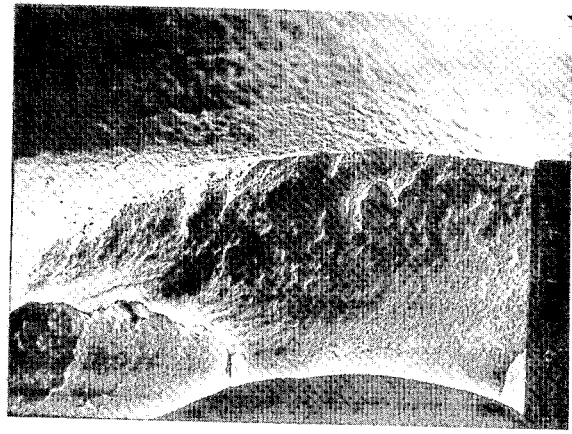
Figure 8:
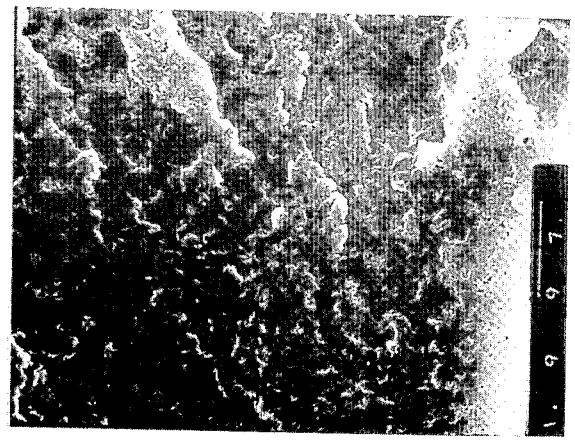
Figure 16:
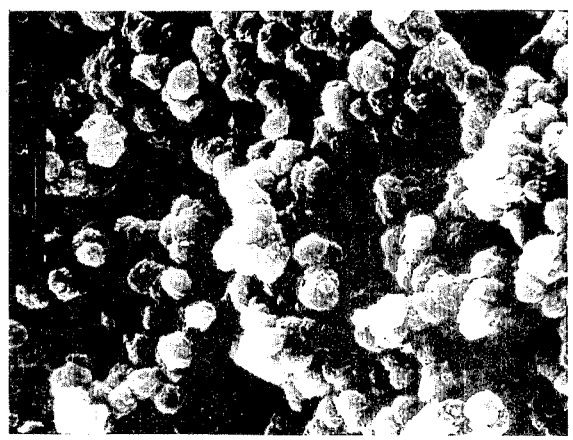
FIGS. 16–20 are photographs of outer surfaces of hollow fibers using varying amounts of a crystal seed forming agent taken through a scanning electron microscope.
Figure 17:
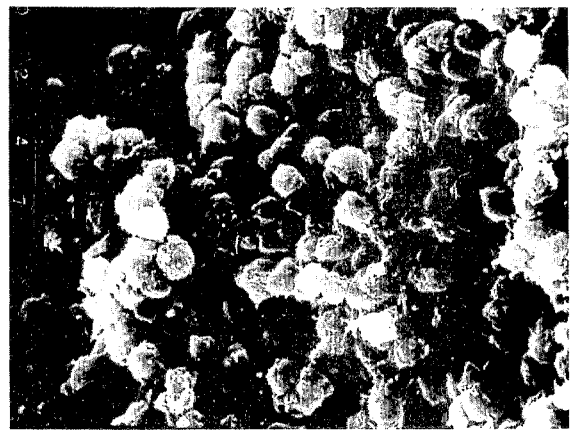
Figure 18:
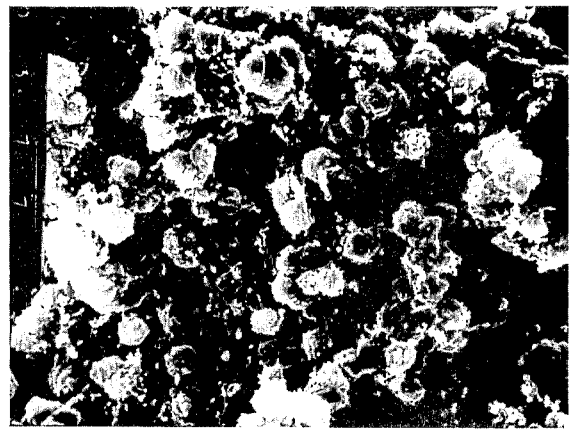
Figure 19:
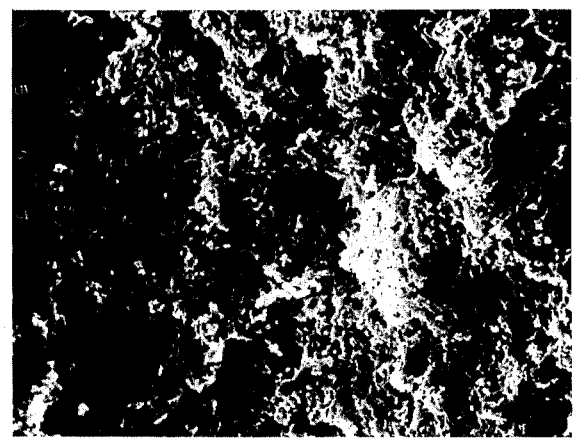
Figure 20:
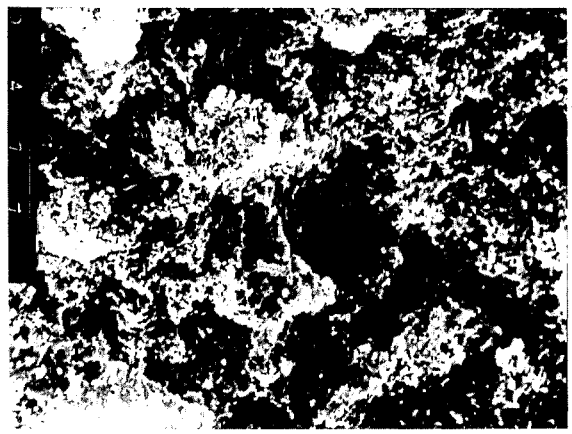

The hollow fiber membrane obtained as described above has an annular cross section of true circularity having an inside diameter of 150 to 300 $\mu$m, preferably 180 to 250 $\mu$m, and a wall thickness of 10 to 150 $\mu$m, preferably 20 to 100 $\mu$m. This cross-sectional structure of the hollow fiber membrane is variable with the conditions under which the hollow fiber membrane is produced. When a liquid substance such as an alcohol or a halogenated hydrocarbon which is capable of melting the organic filler is used as the cooling and solidifying liquid, the hollow fiber membrane forms on the inner wall side thereof a tight layer having fine particles of polyolefin intimately bound and on the surface numerous fine pores as clearly shown in FIG. 3 which represents a photograph taken through a scanning electron microscope at 3,000 magnifications and FIG. 4 which represents a photograph taken through a scanning electron microscope at 10,000 magnifications. As is clear from Fig. 5 which represents a photograph taken through a scanning electron microscope at 300 magnifications and FIG. 6 which represents a photograph taken through a scanning electron microscope at 3,000 magnifications, the hollow fiber membrane forms, on the outer wall side in the direction from the tight layer to the outer wall side, a porous texture layer having fine particles of polyolefin bound in the form of chains. Further as noted from FIG. 7 which represents a photograph taken through a scanning electron microscope at 1,000 magnifications and FIG. 8 which represents a photograph taken through a scanning electron microscope at 3,000 magnifications, fine continuous pores are formed as extended from the inner wall side to the outer wall side. The crosssectional structure described above is variable with the temperature of the cooling and solidifying liquid; the formation of the porous texture layer advances in the direction of the inner wall side as the temperature of the cooling and solidifying liquid increases. It is further clear from FIGS. 16–20 which represent photographs taken through a scanning electron microscope at 3,000 magnifications, the fine particles of polyolefin lose in diameter and the pores consequently formed also lose in diameter in proportion as the amount of the crystal seed forming agent incorporated in the raw material increases. The amount of the crystal seed forming agent incorporated per 100 parts by weight of polyolefin is 0 parts by weight in FIG. 16, 0.05 part by weight in FIG. 17, 0.1 part by weight in FIG. 18, 0.5 part by weight in FIG. 19, and 1.0 part by weight in FIG. 20. In all the cross-sectional structures illustrated, the fine particles are tightly bound near the inner wall side, whereas near the outer wall side, the fine particles are bound in the form of chains and the interstices of these fine particles form continuous pores to give rise to the porous texture layer. The fine particles of polyolefin forming the porous texture layer in the outer wall side have an average particle diameter of 0.01 to 1.0 μm, preferably 0.05 to 0.5 μm. The degree of distribution of these fine particles is variable with the conditions under which the hollow fiber membrane is manufactured and, as the result, the size and proportion of the chains of interstices are similarly variable. The draft ratio is 20 to 1,000, preferably 50 to 500, and the gas flux is 0.1 to 1,000 liters/min.m$^2$.atm, preferably 1.0 to 500 liters/min.m$^2$.atm, and more preferably 5.0 to 200 liters/min.m$^2$.atm. The porosity is 5 to 60%, preferably 10 to 50%.

Now, the hollow fiber membrane of this invention will be described more specifically below. The hollow fiber membrane is formed of fine particles of polyolefin which are finely divided by the crystal seed forming agent incorporated in the raw material. In the inner wall side of the hollow fiber membrane, fine particles of polyolefin are intimately aggregated to form a tight layer and the interstices of these fine particles are fine enough to repress the leakage of blood plasma. In the direction of the outer wall side of the hollow fiber membrane, the fine particles of polyolefin tend to be bound in the form of chains and their interstices gain in volume. These interstices are connected, in a complicate manner, to the pores on the inner wall side of the hollow fiber membrane. As the result, the flow paths formed inside the wall of the hollow fiber membrane are longer than they appear to be. This fact is indicated by the curved path ratio in Table 3. The fact that the curved path ratio is high is considered to have virtually no effect on the transfer of gas ($O_2$ and $CO_2$) but to produce an ample effect in repressing the permeation of blood plasma and steam. The hollow fiber membrane forms on the outer wall side thereof the porous texture layer having the fine particles of polyolefin bound in the form of chains. This porous texture layer communicate with the interstices in the wall of the hollow fiber membrane and this communication is considered to increase the contact area with the gas ($O_2$ and $CO_2$) and enhance the ease of transfer of the gas.

The hollow fiber membrane of this invention possesses a high gas ($O_2$ and $CO_2$) exchange capacity in spite of repressed leakage of blood plasma and a low porosity probably because of the cross-sectional structure the membrane possesses as described above. Because of the low porosity, the membrane possesses ample film strength. These factors are fully evinced by the descriptions offered in the following working examples and the data given in Tables 1 to 4 and FIGS. 3–20.

When the hollow fiber membrane is utilized for separation of blood plasma, for example, namely for the purpose other than the artificial lung, the surface of the membrane exposed to water is required to be treated and furnished with affinity for water so long as it is destined to permit flow of the blood.

Now, the present invention will be described more specifically below with reference to working examples.

EXAMPLES 1–4

In a twin-screw extruder (produced by Ikegai Iron Works, Ltd. and marketed under trademark designation of PCM-30-25), 100 parts by weight of polypropylene having a M.I. of 23, 80 parts by weight of liquid paraffin (number-averaged molecular weight of 324), and 0.5 part by weight of 1,3,2,4-dibenzylidene sorbitol (produced by E.C. Co., Ltd. and marketed under trademark designation of EC-1) as a crystal seed forming agent were melted and kneaded, and extruded. The extruded mixture was then pelletized. In an apparatus illustrated in FIG. 2, the pellets were melted by the use of a twin-screw extruder (produced by Ikegai Iron Works, Ltd. and marketed under trademark designation of PCM-30-25) 13 at 150° to 200≅ C. and the melt was extruded through an annular spinning orifice 15, 1.0 mm in core diameter, 2.9 mm in inside diameter, 3.7 mm in outside diameter, and 15.0 mm in land length at a discharge volume of 8.2 g/min into the ambient air and, at the same time, nitrogen gas is introduced at a rate of 3.0 ml/min. into the hollow center. The hollow thread 17 of molten mixture was left falling down. After a fall distance of 50 mm, the hollow thread 17 was brought into contact with 1,1,2-trichloro-1,2,2,-trifluoroethane (hereinafter referred to as "Freon 113") held in a cooling tank 19. It was then brought into parallel flow contact with Freon 113 flowing down a cooling and solidifying liquid flow tube 20 under gravitational attraction, for further cooling. In this while, the temperature of Freon 113 was as shown in Table 1. Then, the hollow thread 17 was introduced into Freon 113 held in a solidifying tank 19, caused by a directionchanging bar 22 to change its course of travel in a substantially horizontal direction, allowed to advance in that direction for about 3 m so as to be thoroughly solidified, and subsequently taken up on a bobbin 23. The winding speed and the draft ratio during this operation were as shown in Table 1. The hollow thread wound up on the bobbin was cut into pieces 30 cm in length, immersed in Freon 113 at a temperature of 23° C. twice, each for five minutes to effect extraction, and subsequently heated in air at 140° C. for two minutes. Consequently, there was obtained a hollow fiber membrane exhibiting properties indicated in Table 1.

EXAMPLES 5–12

In a twin-screw extruder (produced by Ikegai Iron Works, Ltd. and marketed under trademark designation of PCM-30-25), 100 parts by weight of polypropylene having a M.I. of 23, 80 parts by weight of liquid paraffin (numberaveraged molecular weight of 324), and 0.5 part by weight of 1,3,2,4,-dibenzylidene sorbitol (produced by E.C. Co., Ltd. and marketed trademark designation of "EC-1") as a crystal seed forming agent were melted and mixed. The melt was extruded and then pelletized. With an apparatus illustrated in FIG. 2, the pellets were melted in the twin-screw extruder (produced by Ikegai Iron Works, Ltd. and marketed under trademark designation of PCM-30-25) 13 at 150° to 215° C. The resultant melt was discharged through an annular spinning orifice 15 having a core diameter of 4.0 mm, an inside diameter of 6.0 mm, an outside diameter of 7.0 mm, and a land length of 7.0 mm into the ambient air at a rate of 2.8 g/min and, at the same time, air was introduced through natural suction into the hollow center of the hollow thread of the discharged melt. The hollow thread 17 of the melt was left falling down. The distance of this fall was 26 to 35 mm. The hollow thread 17 was consequently brought into contact with Freon 113 held in the cooling tank 19 and then cooled by being brought into parallel flow contact with Freon 113 spontaneously flowing down the interior of the cooling and solidifying liquid flow tube 20. The temperature of Freon 113 at this time was as shown in Table 1. Then, the hollow thread 17 was introduced into the Freon 113 held in the solidifying tank 19, caused by the direction-changing bar 22 to change its course of travel in a substantially horizontal direction, allowed to advance in that direction about 3 m so as to be throughly solidified, and then taken up on bobbin 23. The winding speed and the draft ratio during this operation were as shown in Table 1. The hollow thread wound up on the bobbin was cut into pieces 30 cm in length, then immersed in Freon 113 at a temperature of 23° C. twice, each for five minutes to effect extraction, and subsequently heated in air at 140° C. for two minutes. Consequently, there was obtained a hollow fiber membrane exhibiting properties indicated in Table 1.

EXAMPLE 13

The procedure of Example 1 was repeated, except that a hydrated poly-α-olefin type synthetic oil (numberaveraged molecular weight 480) was used in the place of liquid paraffin and the spinning was performed under the conditions indicated in Table 1. The results were as shown in Table 1.

EXAMPLES 14–24 AND CONTROL 1

Hollow fiber membranes were produced by following the procedure of Example 1, except that the amount of the liquid paraffin used was varied and the kind and amount crystal seed forming agent were varied. The results were as shown in Table 2. The outer surfaces of the hollow fiber membranes produced by using varying amounts of crystal seed forming agent are shown for comparison in the photographs of FIGS. 16–20 taken through a scanning electron microscope. Control 2

Figure 9:
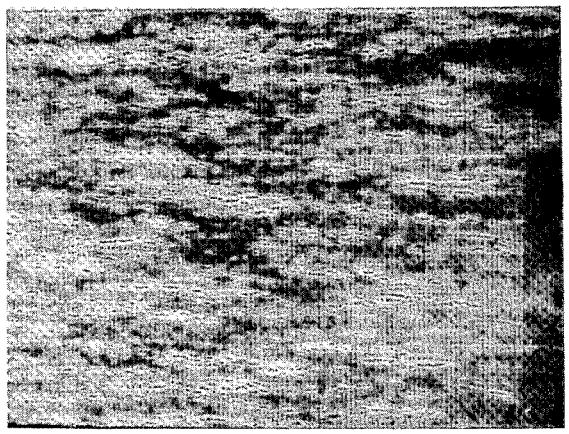
FIGS. 9–14 are photographs of textures of hollow fiber membranes produced by the conventional stretching method.
Figure 10:
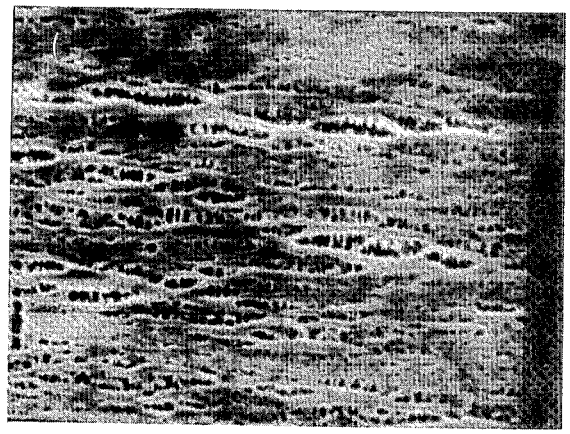
Figure 11:
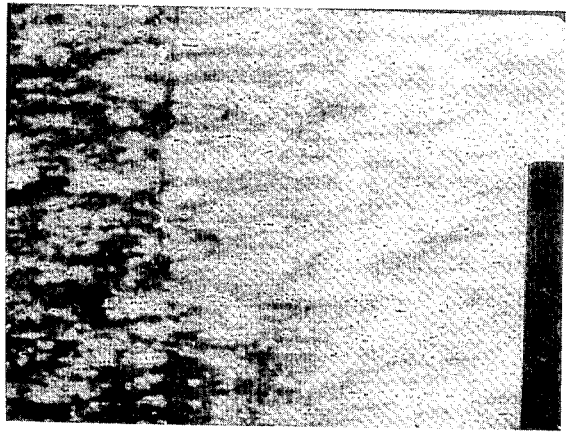
Figure 12:
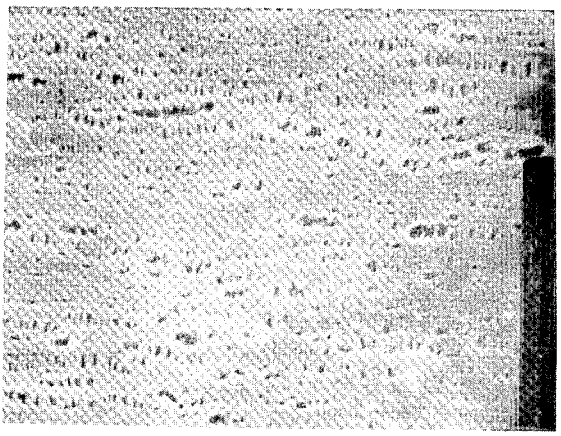
Figure 13:
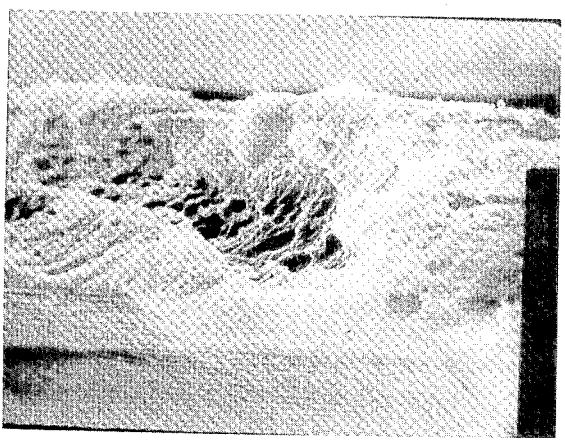
Figure 14:
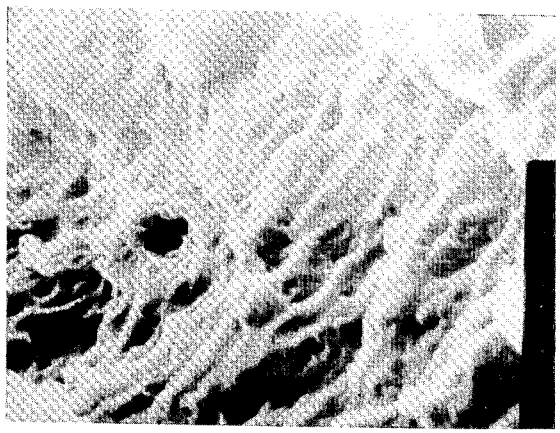

A commercially available polypropylene hollow fiber membrane produced by the stretching method for use in an aritifical lung was tested for properties. The results are shown in Table 2. Photographs of the inner wall surface of the hollow fiber membrane taken through a scanning electron microscope are shown in FIG. 9 (3,000 magnitifications) and FIG. 10 (10,000 magnifications), similar photographs of the outer wall surface shown in FIG. 11 (3,000 magnifications) and FIG. 12 (10,000 magnifications), and similar photographs of the cross section shown in FIG. 13 (3,000 magnifications) and FIG. 14 (10,000 magnifications).

The hollow fiber membranes obtained in Examples 1, 2, 13, and 18 and in Controls 1 and 2 were compared in membrane properties and gas-exchange capacity. The results are shown in Table 3.

The definitions of terms and the methods for determination of properties are shown below.

Pore diameter distribution (function of frequency distribution of poreradius) N (r)

This term designates the number of pores per unit area, having radii in the range of r to r+dr. This property is determined by the calculation of the formula I:

$$a\nu/ap - \nu g\beta g = \pi dr^{-4}/2\sigma \cos\theta \quad (I)$$

using the results of the measurement with a mercury porosimeter (MI method), or by measuring major diameters (a) and minor diameters (b) of the pores appearing in a photograph taken with an electron microscope and finding the frequency distribution of pores based on the geometric means of such diameters (SEM method).

Average pore diameter ri $$\bar{r}i = \int_0^\infty r^i N(r)dr / \int_0^\infty r^{i-1} N(r)dr \quad (II)$$

$$i = 1, 2, \ldots$$

Pore density (Percentage of surface area in total area of pore) N $$N = \int_0^\infty N(r)dr \quad (III)$$

This property is determined from formula IV by photograph (10,000 magnifications) obtained by a scanning electron microscope.

$$N = 1 - A/A° \quad (IV)$$

wherein A° stands for the weight of photograph per unit area and A for the weight of photograph having pores cut off.

Porosity (Percentage of pore volume in total volume of membrane) Pr $$Pr = \int_0^\infty \pi r^2 N(r)dr = \pi \bar{r}_2 \cdot \bar{r}_1 \cdot N \quad (V)$$

This property is determined from the formula VI by the density method.

$$Prp = = 1 - \rho f/\rho p \quad (VII)$$

wherein $\rho f$ stands for the apparent density of a porous membrane, which is calculated from the shape found by measuring the weight of 60 samples 10 mm in side and $\rho p$ for the density of a porous material, which is found from the formula VII by the pychnometer.

$$\rho p = a \cdot d/(b - c + a)$$

wherein a stands for the mass (g) of a sample, b for the mass (g) of the liquid for immersion placed to the mark in the pychnometer, c for the mass (g) of the liquid for immersion placed to the mark in the pychnometer containing the sample, and d for the specific gravity of the liquid for immersion [n-butyl alcohol ($d^2$=0.809 to 0.813) at 23° C.)].

Ratio of curved path (ratio of extended length of curved capillary to thickness of membrane) g $$g = l/L,$$

$$Pr = N \cdot q \quad (VIII)$$

wherein L stands for the thickness of membrane and l for the extended length of curved capillary. The term "ratio of curved path" designates the value given by the formula IX calculated from the porosity and the pre density in accordance with the formula (VIII).

$$q = Pr/N \quad (IX)$$

Figure 15A:
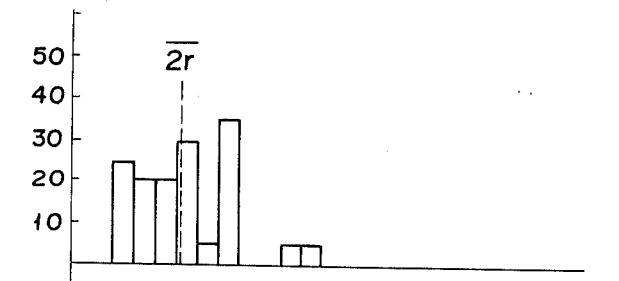
FIGS. 15A, 15B and 15C are graphs showing distributions of pore diameters in hollow fibers.
Figure 15B:
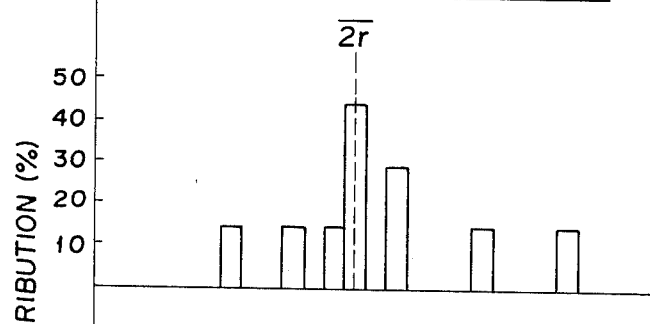
Figure 15C:
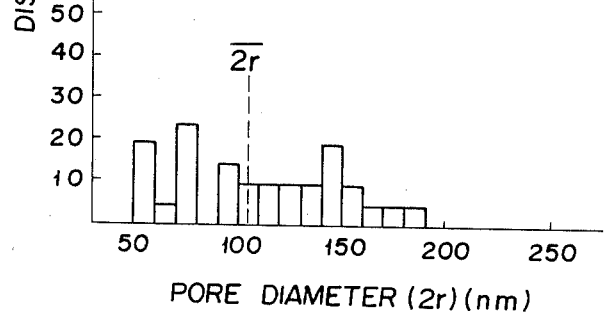

Incidentally, when the hollow fiber membranes of Example 1, Control 1, and Control 2 were tested for pore diameter distribution, the results were as shown in Figs. 15A, 15B and 15C respectively.

Measurement of $O_2$-exchange capacity and $CO_2$-exchange capacity

These capacities were determined by preparing a miniature module of artificial lung having an available length of 140 mm and a membrane surface area of 120 to 130 cm², passing bovine blood (standard venous blood) in a single path through the interior of the hollow fiber membrane, causing flow of pure oxygen to the exterior of the hollow fiber, and measuring the oxygen partial pressure ($P_{O2}$), the carbon dioxide partial pressure ($P_{CO2}$), and the pH of the bovine blood at the inlet and outlet of the hollow fiber with a blood gas measuring device (made by Ratio Meter Co. and marketed under trademark designation of "BGA 3").

Measurement of blood plasma flux and permeability to blood plasma protein

The same miniature modules as used for the determination of $O_2$-exchange capacity and $CO_2$-exchange capacitiy were immersed in water-methanol systems (containing 100%, 50%, and 0% of methanol) respectively for 2 hours, 16 hours, and 2 hours to acquire affinity for water.

Bovine blood was filtered through a filter of 0.45 μm. The blood plasma consequently obtained was kept at 25° C. in a constant temperature bath and passed through the aforementioned miniature modules with a roller pump. The blood plasma which has leaked through the modules was tested for component with a high-speed liquid chromatograph to determine the permeability of the membrane to the components.

The analysis by the high-speed liquid chromatograph was carried out under the following conditions.
Column: TSKG 40000 SW, G 30000 SW, 60 cm x 2
Eluate: Phosphate buffer M/5 $KH_2PO_4$, M/5 $Na_2HPO_4$, 0.3% NaCl, pH 6.8.
Flow rate: 0.8 ml/min.
UV: 280 nm (XO.32)

The permeation was calculated in accordance with the formula X.

$$\% \ T = C_f/C_o \times 100 \qquad (X)$$

wherein Cf stands for the concentration of components in leaking blood plasma and Co for the concentration of components in circulating blood plasma.

TABLE 1

| | Spinning conditions | | | | Shape of hollow fiber | | Membrane properties | |
|---|---|---|---|---|---|---|---|---|
| Example | Temperature of cooling and solidifying liquid (°C.) | Winding speed (m/min.) | Molding temperature (°C.) | Draft ratio | Distance of natural fall (mm) | Inside diameter (μm) | Membrane thickness (μm) | Porosity (%) | $O_2$ flux*(2) (liter/min/m2) |
| 1 | 24 | 170 | 200 | 71 | 50 | 186 | 52 | 20.1 | 21.1 |
| 2 | 0 | 170 | 200 | 71 | 50 | 190 | 55 | 10.3 | 0.36 |
| 3 | 18 | 170 | 200 | 71 | 50 | 205 | 60 | 20.8 | 18. |
| 4 | 39 | 170 | 200 | 71 | 50 | 185 | 53 | 25.4 | 24.3 |
| 5 | 32 | 100 | 155 | 326 | 32 | 215 | 38 | 16.1 | 18.6 |
| 6 | 32 | 100 | 170 | 326 | 35 | 213 | 40 | 24.7 | 39.9 |
| 7 | 32 | 100 | 180 | 326 | 32 | 200 | 42 | 22.5 | 55.7 |
| 8 | 32 | 100 | 160 | 326 | 35 | 215 | 40 | 24.4 | 59.9 |
| 9 | 31 | 100 | 170 | 326 | 26 | 195 | 28 | 10.4 | 7.1 |
| 10 | 24 | 100 | 205 | 326 | 34 | 189 | 29 | 18.3 | 8.6 |
| 11 | 23 | 100 | 210 | 326 | 34 | 197 | 28 | 21.3 | 25.8 |
| 12 | 23 | 100 | 215 | 326 | 34 | 130 | 37 | 22.0 | 75.6 |
| 13* | 25 | 100 | 200 | 326 | 34 | 190 | 50 | 22.0 | 23.8 |

*(1) In Example 13, hydrated α-olefin type synthetic oil was used as organic fillter. In the other examples, liquid paraffin was used.
*(2) The values of $O_2$ flux were reduced to those per 1 atm.

TABLE 2

| | Raw material composition | | | Spinning conditions | | | | Shape of hollow fiber | | Membrane properties | |
|---|---|---|---|---|---|---|---|---|---|---|---|
| Example | Amount of organic filler (phr) | Kind of crystal seed forming agent | Amount of crystal seed forming agent (phr) | Temperature of cooling and solidifying liquid (°C.) | Winding speed (m/min.) | Draft ratio | Distance of natural fall (mm) | Inside diameter (μm) | Membrane thickness (μm) | Porosity (%) | $O_2$ flux (liter/min · m²) |
| 14 | 80 | EC-1 *1 | 0.05 | 26 | 140 | 59 | 50 | 232 | 80 | 32.4 | 340 |
| 15 | 80 | EC-1 *1 | 0.1 | 26 | " | " | " | 245 | 72 | 25.2 | 146 |
| 1 | 80 | EC-1 *1 | 0.5 | 25 | " | " | " | 186 | 52 | 21.1 | 21.2 |
| 16 | 60 | EC-1 *1 | 0.5 | 24 | " | " | " | 243 | 60 | 23.8 | 24.0 |
| 17 | 80 | EC-1 *1 | 1.0 | 25 | " | " | " | 228 | 65 | 24.0 | 26.2 |
| 18 | 80 | Gelol MD *2 | 1.0 | 27 | " | " | " | 195 | 58 | 22.5 | 21.8 |
| 19 | 80 | NC-4 *3 | 1.0 | 26 | " | " | " | 255 | 72 | 26.0 | 39.0 |
| 20 | 80 | MARK, NA-10R *4 | 1.0 | 26 | " | " | " | 186 | 56 | 22.0 | 21.0 |
| 21 | 80 | Sodium benzoate | 1.0 | 26 | " | " | " | 246 | 74 | 25.8 | 38.0 |
| 22 | 80 | Adipic acid | 1.0 | 27 | " | " | " | 242 | 68 | 25.1 | 32.9 |
| 23 | 80 | Talk | 1.0 | 24 | " | " | " | 218 | 60 | 24.0 | 31.3 |
| 24 | 80 | Kaolin | 1.0 | 25 | " | " | " | 220 | 71 | 24.8 | 39.4 |
| Control 1 | 80 | — | — | 27 | 140 | 73 | 90 | 183 | 80 | 21.9 | 420 |
| Control 2 | — | — | — | — | — | — | — | 191 | 23 | 49.1 | 1270 |

TABLE 2-continued

| | Raw material composition | | Spinning conditions | | | | Shape of hollow fiber | | Membrane properties | |
|---|---|---|---|---|---|---|---|---|---|---|
| Example | Amount of organic filler (phr) | Kind of crystal seed forming agent | Amount of crystal seed forming agent (phr) | Temperature of cooling and solidifying liquid (°C.) | Winding speed (m/min.) | Draft ratio | Distance of natural fall (mm) | Inside diameter (μm) | Membrane thickness (μm) | Porosity (%) | $O_2$ flux (liter/min·m$^2$) |

*1 1.3, 2.4-Dibenzylidene sorbitol (produced by EC Chemical and marketed under trademark designation of "EC-1")

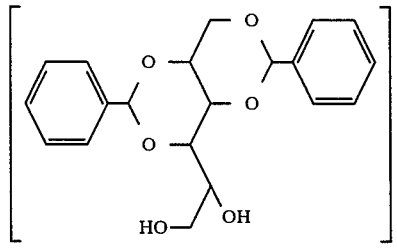

*2 1.3, 2.4-Bis-(p-methylbenzylidene)-sorbitol (produced by EC Chemical and marketed under trademark designation of "Gelol MD")

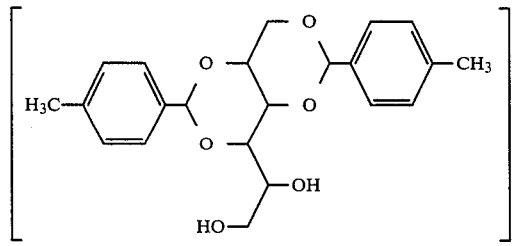

*3 1.3, 2.4-Bis(p-ethylbenzylidene)-sorbitol "NC-4")

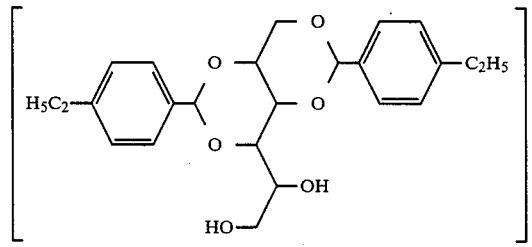

*4 Bis-(4-t-butylphenyl)sodium phosphate (MARK, NA-10R)

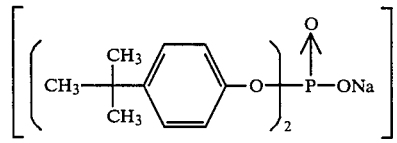

TABLE 3

| | Porosity (%) | Ratio of curved path | Water flux (ml/min·m$^2$) | $O_2$—exchange capacity (ml/min·m$^2$) | $CO_2$—exchange capacity (ml/min·m$^2$) | Blood plasma flux (ml/(min·m$^2$)) | Permeability to blood plasma protein (%) | | | |
|---|---|---|---|---|---|---|---|---|---|---|
| | | | | | | | MW 900,000 | MW 160,000 | MW 68,000 | MW 8,000 |
| Example | | | | | | | | | | |
| 1 | 5.13 | 4.11 | 70.5 | 40.3 | 46.7 | 15.1 | 0 | 18.3 | 23.8 | 100 |
| 2 | 2.38 | 4.57 | 10.2 | 30.6 | 29.9 | 2.2 | 0 | 7.8 | 10.2 | 95 |
| 13 | 5.33 | 4.30 | 83.7 | 42.4 | 49.8 | 17.3 | 0 | 22.1 | 25.0 | 100 |
| 18 | 5.03 | 4.01 | 64.8 | 41.8 | 44.7 | 19.2 | 0 | 17.8 | 24.0 | 100 |
| Control | | | | | | | | | | |
| 1 | 5.94 | 3.68 | 965 | 41.5 | 41.3 | 22.6 | 14.0 | 61.0 | 94.8 | 100 |
| 2 | 18.8 | 2.61 | 2640 | 37.1 | 56.5 | 286 | 0 | 17.4 | 31.9 | 100 |

TABLE 4

| | | Pore diameter properties by photograph through scanning electron microscope | | | |
|---|---|---|---|---|---|
| | | Pore diameter (μm) | | Particle diameter (μm) | |
| Sample | Composition | Inner wall side | Outer wall side | Inner wall side | Outer wall side |
| 1 | Polypropylene | | | | |
| | Liquid paraffin | 0.05 | 0.1 | Smooth | 0.1 |
| | Crystal seed forming agent (0.5 phr) | ~0.8 | ~3.0 | | ~0.5 Reticular |
| 2 | Polypropylene | 0.1 | 0.3 | 1.0 | 1.0 |
| | Liquid paraffin | ~0.5 | ~6.0 | ~3.0 | ~3.0 Partial linkage |

As described above, the present invention relates to a porous hollow fiber membrane which comprises a polyolefin hollow fiber membrane of an annular cross section of substantially true circle 150 to 300 μm in inside diameter and 10 to 150 μm in wall thickness, the hollow fiber membrane forming on the inner wall side thereof a tight layer of intimately bound fine polyolefin particles and on the outer wall side thereof a porous texture of fine polyolefin particles bound in chains and containing fine pores extended continuously from the inner wall side to the outer wall side. The continuously extended fine pores do not pierce the membrane linearly in the direction of thickness of the membrane but comprise the numerous fine pores extended inwardly from the outer wall side as formed between the aforementioned chains of fine particles or between the fine particles and mutually connected. The porous hollow fiber membrane, therefore, enjoys extremely high uniformity and sufficient strength. Further, the hollow fiber membrane has the advantage that, when it is used in an artificial lung, it exhibits as large gas-exchange capacity in spite of its high ability to preclude leakage of blood plasma.

Further, this invention relates to a method for the manufacture of a hollow fiber membrane, characterized by the steps of mixing a polyolefin, an organic filler uniformly dispersible in the polyolefin under conditions capable of melting the polyolefin and readily soluble in an extractant to be used, and a crystal seed forming agent, discharging the resultant mixture in a molten state through an annular spinning orifice and, at the same time, introducing an inert gas into the hollow center of the discharged tube of the mixture advancing the discharged tube into contact with a cooling and solidifying liquid incapable of melting the polyolefin thereby cooling and solidifying the tube, and subsequently bringing the cooled and solidified tube into contactt with an extractant incapable of melting the polyolefin thereby extracting the organic filler out of the tube. The fine pores are formed in the interstices of the polyolefin particles because the polyolefin and the organic filler in the spinning dope converted into a uniform dispersion in a molten state are separated into two independent phases while the dope is being cooled and solidified and the filler so separated is removed by extraction. Moreover, the crystal seed forming agent incorporated in the dope serves to promote size reduction of the polyolefin particles and, consequently, enables the fine pores to be further decreased in diameter. The phase separation can be controlled in the direction of thickness of the membrane by suitably selecting the amount of the organic filler to be contained in the dope, the amount of the crystal seed forming agent similarly contained, the temperature of cooling, the mutual miscibility between the cooling and solidifying agent and the organic filler, and the spinning draft ratio, for example.

The melt spinning method which uses a gas as a hollow center forming agent has heretofore been recognized as an unfavorable approach to the production of a hollow fiber of a cross section of true circle. In the present invention, since the cooling of the discharged tube of molten dope is effected by using a liquid of high cooling effect instead of a gas and the tube of molten dope is cooled and solidified by causing this tube to flow down parallelly to the cooling and solidifying liquid through the cooling and solidifying liquid flow tube, the hollow thread in the process of being converted into a hollow fiber membrane is not exposed to any external force exerted in the direction of thickness of the membrane but is enabled to retain a cross section of true circle. Owing to this particular procedure of spinning the cooling device enjoys improved stability of quality reflecting heightened operational efficiency and facilitated temperature control.

The hollow fiber membrane, on an additional heat treatment, is enabled to acquire stabilized structure and, consequently, enjoy improved dimensional stability and improved membrane property.

What is claimed is:

1. A porous hollow fiber membrane, comprising a polypropylene hollow fiber membrane of an annular cross section of substantial circle 150 to 300 μm in inside diameter and 10 to 150 μm in wall thickness made of polypropylene containing a crystal seed forming agent and having a high degree of crystallization, said hollow fiber membrane having an anisotropic structure that has on the inner wall side thereof a tight layer of intimately bound fine polypropylene particles and fine pores, and on the outer wall side thereof, a porous texture layer of fine polypropylene particles bound in chains and fine pores, the pores of said tight layer and said texture layer communicating with each other to form fine pores extending continuously from said inner wall side to said outer wall side.

2. A porous hollow fiber membrane according to claim 1, which possesses between the inner wall side and the outer wall side thereof a continuous anisotropic structure wherein the interstices of said fine particles assume an increasingly fine tight layer toward the inner wall side.

3. A porous hollow fiber membrane according to claim 1, wherein the porosity is in the range of 5 to 60%.

4. A porous hollow fiber membrane according to claim 1, wherein the gas flux is in the range of 0.1 to 1,000 liters/min.m².atm.

5. A porous hollow fiber membrane according to claim 1, wherein the gas flux is in the range of 1 to 500 liters/min.m².atm.

6. A porous hollow fiber membrane according to claim 1, wherein said fine particles on the outer wall side have an average particle diameter in the range of 0.01 to 1.0 μm.

7. A porous hollow fiber membrane according to claim 1, wherein said inside diameter is in the range of 180 to 250 μm and said wall thickness in the range of 20 to 100 μm.

8. A porous hollow fiber membrane according to claim 1, wherein said polypropylene has at least 97% of tacticity.

9. A porous hollow fiber membrane according to claim 1, wherein the amount of said crystal seed forming agent is 0.1 to 5 parts by weight per 100 parts by weight of said polypropylene.

10. A porous hollow fiber membrane according to claim 1, wherein said crystal seed forming agent is at least one member selected from the group consisting of 1,3,2,4-dibenzylidene sorbitol, 1,3,2,4-bis(p-methylbenzylidene)-sorbitol, 1,3,2,4-bisp-ethylbenzylidene)-sorbitol, sodium bis(4-t-butylphenyl)phosphate, sodium benzoate, adipic acid, talc, and kaolin.

11. A porous hollow fiber membrane according to claim 1, wherein pore diameter of said inner wall side is 0.05 to 0.8 μm and pore diameter of said outer wall side is 0.1 to 3.0 μm.

12. A porous hollow fiber membrane according to claim 1, wherein said membrane has at least about 4 of ratio of curved path.

13. A porous hollow fiber membrane according to claim 1, wherein said membrane has at most 19.2 ml/min·m² of plasma flux.

* * * * *

UNITED STATES PATENT AND TRADEMARK OFFICE
CERTIFICATE OF CORRECTION

PATENT NO. : 4,708,800
DATED : November 24, 1987
INVENTOR(S) : ICHIKAWA et al

It is certified that error appears in the above-identified patent and that said Letters Patent is hereby corrected as shown below:

Column 5, line 30: replace "ansering" with --answering--.
Column 7, line 2: replace "the" with --this--.
Column 9, line 22: replace "In" with --On--.
Column 11, line 61, left portion of the formula (I):
        replace "$\alpha v/\alpha p$" with --$\Delta v/\Delta p$--.
Column 15, about line 8: replace "*1 1.3, 2.4-" with
        --*1: 1,3,2,4- --.
Column 15, about line 21: replace "*2 1.3, 2.4-" with
        --*2: 1,3,2,4- --.
Column 15, about line 30: replace "*3 1.3, 2.4-" with
        --*3: 1,3,2,4- --.
Column 15, about line 45: replace "*4" with --*4:--.
Column 17, line 50: replace "contactt" with --contact--.

Signed and Sealed this

Fifteenth Day of December, 1992

*Attest:*

DOUGLAS B. COMER

*Attesting Officer*      *Acting Commissioner of Patents and Trademarks*